INVENTORS
JOHN C. ABROMAVAGE
JAMES W. RYDEN

BY David N. Semmes

ATTORNEY

United States Patent Office 3,560,024
Patented Feb. 2, 1971

3,560,024
SMALL CAR HITCH BAR ASSEMBLY
John C. Abromavage, Tempe, and James W. Ryden, Phoenix, Ariz., assignors to Arcoa, Inc., Phoenix, Ariz., a corporation of Oregon
Filed June 25, 1969, Ser. No. 836,235
Int. Cl. B60d 1/14
U.S. Cl. 280—502                                     7 Claims

ABSTRACT OF THE DISCLOSURE

A hitch bar assembly of the type mounting a ball socket and attachable to the rear bumper of Volkswagen type vehicles where the trailer load is not a critical factor. The invention is directed principally to bumper clasping compressive elements mounted at both ends of the hitch bar.

BACKGROUND OF THE INVENTION

(1) Field of the invention

In the trailer rental industry there has developed a need for a towing vehicle hitch bar which may be mounted compressively upon a variety of towing vehicle bumpers. Principal requirements are that the assembly be quickly and securely attachable to the towing vehicle bumper by one who is unskilled or at least unfamiliar with the hitch bar assembly. The compressing elements should not damage the towing vehicle bumper, yet rigidly supporting the ball socket upon the longitudinal axis of the towing vehicle.

SUMMARY OF THE INVENTION

According to the present invention compressive elements are secured at each end of a hitch bar, the compressive elements pressurizing the towing vehicle bumper at the top edge, the bottom edge, and the mid-section, while supporting the ball socket in alignment with the horizontal axis of the bumper. Thus, the trailer load is placed in the mid-section and strongest portion of the towing vehicle bumper. The compressive elements include a housing defining a forwardly extending bumper bottom engaging seat and a rearwardly extending hitch support leg. The housing has an inclined compression channel. A top compressive element fits complementally within the compression channel and is compressed with respect to the housing by means of a nut engaging a threaded bolt extending through the clamp. As the nut is tightened, the top compressive element is tensioned with respect to the towing vehicle bumper, so that bumper top edge, bottom edge and mid-section are engaged.

DESCRIPTION OF THE PREFERRED EMBODIMENTS

Figure 1:
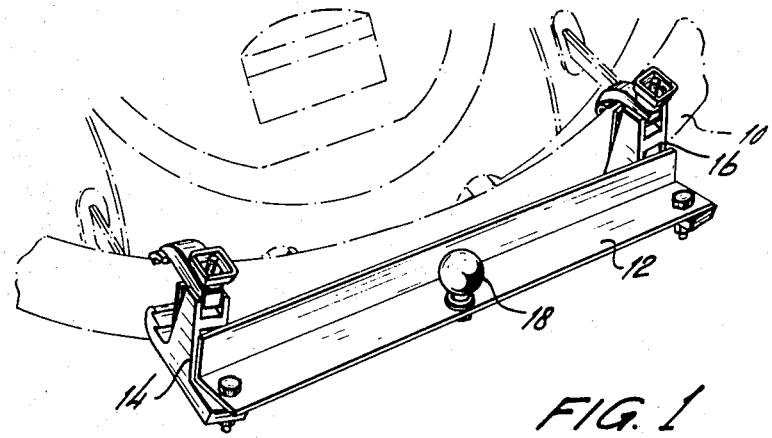
FIG. 1 is a perspective view of the proposed hitch assembly installed upon Volkswagen bumper, shown in fragment.
Figure 2:
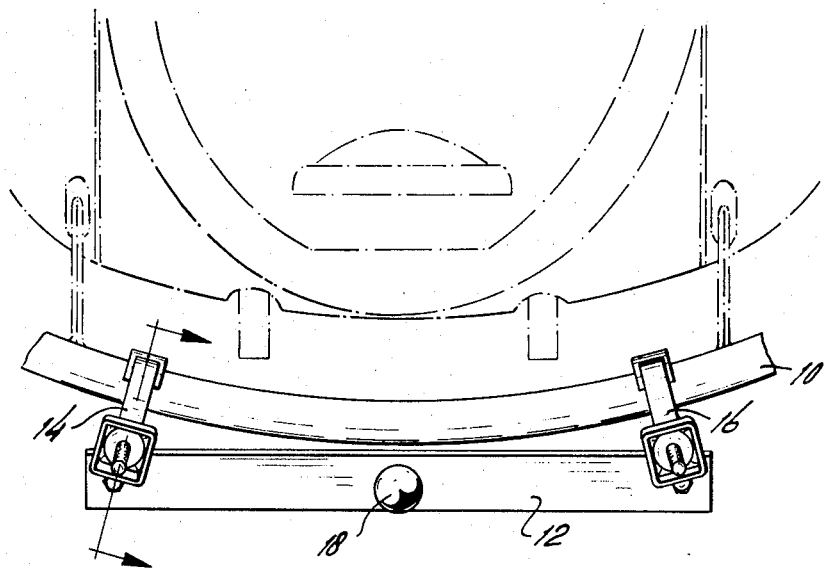
FIG. 2 is a top plan thereof.

In FIG. 1 a Volkswagen is illustrated as having a rear bumper 10 to which is attached the hitch bar assembly comprised of compressive elements 14 and 16, engaging bumper 10, while supporting the hitch bar 12 and ball socket assembly 18. The ball socket assembly is supported in substantial alignment with the longitudinal axis of the towing vehicle as well as the horizontal axis of the rear bumper. The ball socket 18 may be secured to the hitch 12 by means of a threaded bolt extending through the bar and lock washer and nut means.

Figure 3:
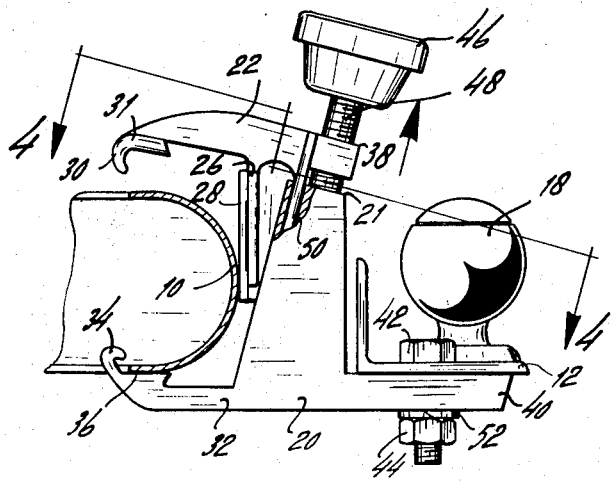
FIG. 3 is a side elevation partially in section, showing the compressive element prior to engaging the bumper.
Figure 4:
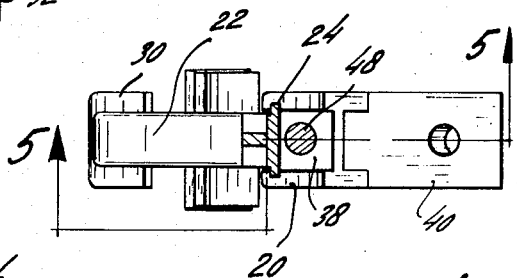
FIG. 4 is a top plan, taken along line 4—4 of FIG. 1.

In FIG. 3 the compression assembly is illustrated as comprised of housing 20 having an inclinedly extending compression slot 50. Top compression bumper engaging clamp 22 includes opposed flanges 24 which slide complementally within slot 50. Clamp 22 includes arcuate bumper engaging cup 30, and vertical pressurizing surface 26 to which a web 28 or other resilient material may be attached. A compression lug 38 extends rearwardly of clamp 22, encompassing threaded bolt 48 which is mounted within housing 20 in parallel with slot 50.

At the bottom of the housing a forwardly extending arm or bumper bottom engaging seat 32 includes bumper abutting seat 36 and bumper bottom edge engaging cup 34. A rearwardly extending leg 40 includes aperture 41. Hitch bolt 42 extends through a hole in the hitch bar 12, through aperture 40 and is secured by means of lock washer 52 and nut 44. In FIG. 3 the assembly is illustrated prior to compression.

Figure 5:
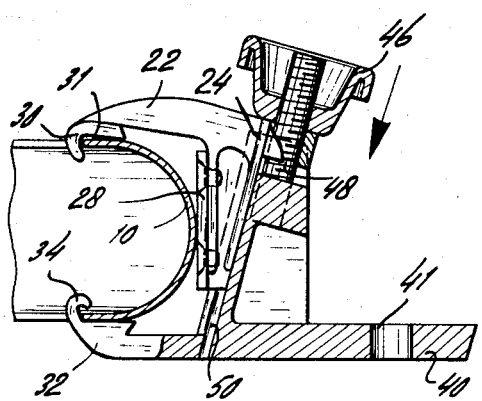
FIG. 5 is a transverse section, showing the top and bottom clasping elements engaging the towing vehicle bumper top edge, bottom edge and mid-section in a state of compression.

In FIG. 5 the assembly is illustrated as compressed with the top clamping cup 30 engaging the bumper top edge as its pressurizing surface 31 engages the top of the bumper. Simultaneously surface 28 is applied at the mid-section of the bumper 10 and the bumper bottom abuts seat 36 and is secured in place by cup 34.

As will be apparent, the axis of the hitch bar is substantially aligned with the horizontal axis of the bumper, so that the stress of the trailer load is applied where the bumper is strongest.

The compression elements may be fixed to the bumper before installing the hitch bar. As the clamps are compressed about the bumper the hitch bar is attached, eliminating the necessity for aligning the ball socket vertically. The hitch bar is configured so that any longitudinal stress placed upon the hitch bar cannot result in dislodging of the clamps.

We claim:
1. A hitch bar assembly of the type attachable to a towing vehicle rear bumper comprising:
   (A) a horizontal hitch bar, supporting a ball socket;
   (B) a pair of bumper clasping compressive elements secured to the opposed ends of said hitch bar, each said compressive element including:
      (i) a housing, defining a substantially vertically extending compression slot, a bumper bottom engaging seat extending forwardly of said housing and hitch bar support leg extending rearwardly of said housing;
   (C) a threaded bolt extending upwardly from said housing in parallel with said compression slot, and having a locking nut threaded thereon above said housing; and
   (D) a top compressive element complementally engaging said compression slot and including a bumper top clasping leg extending at one end forwardly of said housing and at its other end including aperture encircling a threaded bolt engaging said bolt above said housing;
said top bumper top clasping leg and said bumper bottom engaging seat having arcuate flanges complementally engageable with the bumper top edge and bottom edge; said vertically extending compression slot including opposed channels inset within the inner face of said housing and said top compressive element having comple- mental flanges engageable with said slot so as to secure slidably said top compressive element within said housing.

2. A hitch bar as in claim 1, said bottom engaging seat and said hitch bar support leg being horizontally aligned.

3. A hitch bar as in claim 2, said hitch bar support leg having a hole extending therethrough and said hitch bar support leg to said housing by bolt means extending through said hole.

4. A hitch bar of the type as in claim 3, said top compressive element including a vertically extending bumper abutting surface engageable with the bumper mid-section, as said top compressive element is compressed.

5. A hitch bar of the type as in claim 4, said compressive slot and said threaded bolt being inclined and said abutting surface being presented perpendicularly with respect to the axis of said bumper.

6. A hitch bar of the type as in claim 5, said abutting surface having a resilient protective member secured thereto.

7. A hitch bar as in claim 6, said compressive slot extending in said housing from above said top clasping leg to below said bumper bottom engaging seat.

References Cited

UNITED STATES PATENTS

| 2,250,661 | 7/1941 | Thorp et al. | 280—502 |
| 2,525,505 | 10/1950 | Wiedman | 280—502 |
| 2,529,686 | 11/1950 | Green | 280—502 |
| 2,747,893 | 5/1956 | Strand | 280—502 |
| 3,113,789 | 12/1963 | Safford | 280—502 |

LEO FRIAGLIA, Primary Examiner

R. R. SONG, Assistant Examiner